United States Patent
Predki (10) Patent No.: US 11,084,111 B2
(45) Date of Patent: Aug. 10, 2021

(54) METHOD FOR AUTOMATED POSITIONING OF A TOOTHED WORKPIECE AND MANUFACTURING SYSTEM FOR CARRYING OUT THE METHOD

(71) Applicant: Klingelnberg GmbH, Hückeswagen (DE)

(72) Inventor: Thomas Predki, Bad Bentheim (DE)

(73) Assignee: Klingelnberg GmbH

( * ) Notice: Subject to any disclaimer, the term of this patent is extended or adjusted under 35 U.S.C. 154(b) by 0 days.

(21) Appl. No.: 16/251,996

(22) Filed: Jan. 18, 2019

(65) Prior Publication Data
US 2019/0232406 A1    Aug. 1, 2019

(30) Foreign Application Priority Data
Jan. 26, 2018    (EP) ..................................... 18153727

(51) Int. Cl.
*B23F 23/12*    (2006.01)

(52) U.S. Cl.
CPC ..................................... *B23F 23/12* (2013.01)

(58) Field of Classification Search
CPC .. B23F 23/1218; B23F 23/12; B23Q 17/2414; B23Q 17/2428; B23Q 17/2471; B23Q 17/2447; B23Q 15/20; B23Q 15/22; B23Q 15/24; B23Q 15/26; G05B 2219/37097; G05B 2219/36373; G05B 2219/40538
See application file for complete search history.

(56) References Cited

U.S. PATENT DOCUMENTS 4,325,125 A * 4/1982 Buchfeld ................. B23Q 7/18
                                                             318/640
4,902,175 A * 2/1990 Faulstich ................ B23F 23/12
                                                             408/1 R
(Continued)

FOREIGN PATENT DOCUMENTS

CH          682853 A5      11/1993
DE       3622845 A1 *    1/1987    ............. B23Q 15/22
(Continued)

OTHER PUBLICATIONS

Description CH682853 (translation) obtained at https://worldwide.espacenet.com/ (last visited Jun. 30, 2020).*
(Continued)

*Primary Examiner* — Ryan Rufo
(74) *Attorney, Agent, or Firm* — McCarter & English, LLP (57) ABSTRACT

A method for automated positioning of a toothed workpiece, having the following method steps:
providing a toothed workpiece, which has a machine-readable, workpiece-specific marking, such as a QR code, a barcode, an RFID tag, or the like;
attaching the toothed workpiece on a spindle of a CNC-controlled multiaxis machine;
automatically acquiring the marking of the workpiece;
ascertaining an actual position of the workpiece in relation to the multiaxis machine on the basis of the marking;
transferring the workpiece from the actual position into a setpoint position in relation to the multiaxis machine, before a machining and/or measuring method is carried out in the multiaxis machine.

12 Claims, 3 Drawing Sheets

(56) References Cited

U.S. PATENT DOCUMENTS

| | | | | |
|---|---|---|---|---|
| 5,292,212 A | * | 3/1994 | Taylor | B23F 21/226 |
| | | | | 33/501.14 |
| 2001/0056313 A1 | | 12/2001 | Osborne | |
| 2003/0151151 A1 | * | 8/2003 | DeMint | G11B 7/268 |
| | | | | 264/2.7 |
| 2006/0048853 A1 | * | 3/2006 | Boyd | B23Q 15/22 |
| | | | | 144/394 |
| 2009/0019697 A1 | * | 1/2009 | Dodd | B23F 17/006 |
| | | | | 29/893.3 |
| 2010/0138006 A1 | * | 6/2010 | Mies | G05B 19/402 |
| | | | | 700/57 |
| 2012/0038307 A1 | * | 2/2012 | Ahn | B23Q 15/22 |
| | | | | 318/640 |
| 2013/0071198 A1 | * | 3/2013 | Kiryu | B23Q 17/2461 |
| | | | | 409/80 |
| 2013/0276280 A1 | * | 10/2013 | Wielens | B23Q 17/2428 |
| | | | | 29/407.04 |
| 2014/0263216 A1 | * | 9/2014 | Clark | G11B 5/0245 |
| | | | | 219/121.71 |
| 2015/0197009 A1 | | 7/2015 | Melikian | |
| 2016/0217364 A1 | * | 7/2016 | Ronneberger | B23F 23/1237 |
| 2016/0239949 A1 | * | 8/2016 | Ogawa | G05B 19/402 |
| 2017/0028520 A1 | * | 2/2017 | Jesu Plu | B23Q 17/2471 |
| 2017/0124367 A1 | * | 5/2017 | Margalit | G06T 7/75 |

FOREIGN PATENT DOCUMENTS

| | | | | |
|---|---|---|---|---|
| DE | 19631620 A1 | * | 2/1998 | G05B 19/402 |
| DE | 102007043497 A1 | | 3/2009 | |
| WO | 2017074560 A1 | | 5/2017 | |

OTHER PUBLICATIONS

Description DE19631620 (translation) obtained at https://worldwide.espacenet.com/ (last visited Jun. 30, 2020).*

Search Report for Application No. 18153727.5, dated Jul. 13, 2018, 8 pages.

* cited by examiner

METHOD FOR AUTOMATED POSITIONING OF A TOOTHED WORKPIECE AND MANUFACTURING SYSTEM FOR CARRYING OUT THE METHOD

CROSS-REFERENCE TO RELATED APPLICATIONS

This application claims the benefit under 35 U.S.C. § 119(e) to European patent application no. EP 18 153 727.5 filed Jan. 26, 2018, which is hereby expressly incorporated by reference as part of the present disclosure.

FIELD OF THE INVENTION

The present disclosure relates to methods for the automated positioning of a toothed workpiece and manufacturing systems for carrying out such methods.

BACKGROUND

In industrial manufacturing, workpieces are provided with barcodes, QR codes, or RFID tags, to identify each individual workpiece unambiguously and track it along the value chain. In this case, workpiece-specific data can be associated with each workpiece, which have been acquired during machining or measuring steps.

In the mass production of toothed workpieces, workpiece-specific data are used, for example, to correct the process parameters of gear cutting machines. Individual workpieces are thus measured at regular intervals to ensure that the required manufacturing accuracy is maintained. If there is a need for correction, correction values are ascertained on the basis of the measurement data, which are transferred manually to the machine itself or via a network to the machine controller.

SUMMARY

It is an object to achieve the required manufacturing accuracy as efficiently as possible during the production of toothed workpieces.

According to a first aspect, at least some embodiments relate to a method for automated positioning of a toothed workpiece, having the following method steps: providing a toothed workpiece, which has a machine-readable, workpiece-specific marking, such as a QR code, a barcode, an RFID tag, or the like; attaching the toothed workpiece to a spindle of a CNC-controlled multi-axis machine; automatically acquiring the marking of the workpiece; ascertaining an actual position of the workpiece in relation to the multiaxis machine on the basis of the marking; transferring the workpiece from the actual position into a setpoint position in relation to the multiaxis machine, before a machining and/or measuring method is carried out in the multiaxis machine.

The workpiece-specific marking is therefore used both for identifying the workpiece and also for positioning the workpiece. If, for example, a QR code is provided on the toothed workpiece, the position of the QR code on the workpiece is therefore a geometrical reference mark for positioning the workpiece inside the machine.

A geometrical referencing with the aid of the workpiece-specific marking enables in particular a workpiece-specific assignment and use of real-time process data for running and/or following manufacturing steps.

The automated acquisition of the marking comprises at least the determination of the position of the marking in relation to the CNC-controlled multiaxis machine. It can additionally also comprise the reading of a coded item of information for the workpiece identification.

The coded information of the marking can be an unambiguous marking in the meaning of a unique identifier (UID).

The toothed workpiece can be, for example, a spur gear or a bevel gear.

In at least some embodiments, the marking is embodied sufficiently robustly that it reliably withstands a heat treatment of the workpiece, wherein the marking can be formed in particular by a deformation and/or a material removal in the region of a workpiece surface. The marking can thus be produced, for example, as needle embossing on the workpiece. Furthermore, the marking can be formed by laser marking. Accordingly, a barcode or QR code remains intact over the entire manufacturing chain. The marking itself can possibly still be readable even after multiple years of use of the finished workpiece, for example, in a vehicle transmission.

It can be provided that the provision of the toothed workpiece merely means the supply of the workpiece already provided with a marking to the CNC-controlled multiaxis machine, wherein the supply can take place manually or automatically.

Alternatively or additionally, a further embodiment of the method is characterized by the provision of the toothed workpiece, having the following method steps: providing the machine-readable, workpiece-specific marking on the workpiece; manufacturing a reference geometry, such as a tooth gap, a tooth flank, or the like, by gear cutting of a workpiece blank; determining a distance between the marking and the reference geometry of the toothed workpiece; and storing the distance in a workpiece-specific data set of a database; wherein the distance is acquired vectorially with respect to a machine coordinate system of the multiaxis machine and is stored in the data set.

In this case, the provision of the toothed workpiece comprises the geometric referencing of the toothed workpiece, in which the marking is applied to the workpiece and the distance of this marking to a reference geometry is stored in the database. In subsequent manufacturing steps or measuring steps, this geometric reference can be accessed to enable an automated alignment and/or positioning of the workpiece.

The provision and geometric referencing of the toothed workpiece can accordingly be carried out, for example, by means of a first CNC-controlled multiaxis machine, which is a gear cutting machine or the like.

Subsequently, the attaching of the workpiece on a spindle, the automated acquisition of the marking, the ascertainment of an actual position of the workpiece, and the transfer from the actual position into the setpoint position can take place on a second CNC-controlled multiaxis machine, which is a gear cutting measuring machine or a finishing machine.

The provision of the toothed workpiece can therefore in particular comprise the preliminary gear cutting and the storing of the geometrical referencing in a database, which can be accessed in following manufacturing steps or measuring steps.

The manufacturing of the reference geometry can take place in principle before or after the provision of the machine-readable, workpiece-specific marking on the workpiece. The provision of the machine-readable, workpiece-specific marking on the workpiece takes place before the manufacturing of the reference geometry in at least some embodiments. The marking can thus initially be affixed on the workpiece and/or a non-gear-cut blank (for example, after turning machining) and gear teeth can be produced in a following method step.

The distance between the marking and, for example, the first generated tooth gap can subsequently be measured and stored. Alternatively, the position of a tooth gap, in particular the first tooth gap, in relation to the marking can already be specified by the process kinematics stored in the machine controller before the manufacturing of the tooth gap, so that an additional measurement of the distance can be omitted. This is advantageous in particular for the case in which the production of the marking and the (preliminary) gear cutting of the workpiece take place on one chucking in a CNC-controlled multiaxis machine.

It can be provided that the marking is produced on a non-toothed workpiece, i.e., a blank, even before the workpiece is supplied to a gear cutting machine. As soon as this marked blank is accommodated inside a gear cutting machine, it can be checked with the aid of the marking and the database whether the correct machine kinematics for the relevant blank are loaded into the machine controller and/or process kinematics can be loaded on the basis of the marking and the database and the blank can be positioned to produce the first tooth gap.

Alternatively, in a first step, gear cutting of the workpiece or a non-gear-cut blank can be performed, wherein the marking is generated or affixed after the gear cutting.

In particular, the marking can be produced in this case such that the marking is arranged or aligned with a tooth gap when observed along a radial direction, wherein this can be in particular the first tooth gap generated on the workpiece.

If the specification is that the marking is fundamentally applied facing toward the first tooth gap and aligned with the first tooth gap, a workpiece-individual acquisition of a distance of the marking to the first gap can be omitted.

The attaching of the toothed workpiece on the spindle can be performed by manually inserting the workpiece into a CNC-controlled multiaxis machine. The toothed workpiece, which has the machine-readable, workpiece-specific marking, can thus be placed manually onto a spindle of a gear cutting machine, for example. After the toothed workpiece is accommodated on the spindle, the gear cutting measuring machine acquires the position of the workpiece-specific marking and also the items of coded information, formed as a QR code, for example. On the basis of the workpiece-specific marking, which is used as a geometric reference, the toothed workpiece can be transferred from the actual position into the setpoint position, in order, for example, to enable a collision-free feeding of a measuring feeler into a specific tooth gap.

Alternatively, the attaching of the toothed workpiece can comprise automated equipping of the spindle of the CNC-controlled multiaxis machine, wherein the toothed workpiece is placed on the spindle, for example, with the aid of a handling unit, such as a robot or the like. The toothed workpiece can thus be automatically supplied, for example, to a hard-finishing machine and placed on the spindle of the hard-finishing machine. Subsequently, the hard-finishing machine acquires the position of the workpiece-specific marking and also the items of coded information formed as a barcode, for example. On the basis of the workpiece-specific marking, which is used as a geometrical reference, the toothed workpiece can be transferred from the actual position into the setpoint position, in order, for example, to enable a collision-free introduction of a grinding or holding tool into a tooth gap.

The provision of the machine-readable, workpiece-specific marking can be performed with the aid of a laser or by needle embossing. This has the advantage that the marking is worked permanently and non-removably into the material of the workpiece.

Alternatively, the machine-readable, workpiece-specific marking can be adhesively bonded or printed on the workpiece. A cost-effective marking can thus be achieved, which is detachable from the workpiece again if necessary.

Alternatively, the machine-readable, workpiece-specific marking can be applied to the workpiece by etching.

According to one refinement of the above-described method, the reference geometry can be the first tooth gap formed on the workpiece blank. The marking can thus be used for geometrical referencing of the first tooth gap formed on the workpiece, wherein this first tooth gap can be automatically identified and approached in subsequent manufacturing steps or measuring steps on the basis of the geometrical referencing.

These advantages apply similarly for the alternative that the reference geometry is a tooth flank which delimits the first tooth gap formed on the workpiece blank. In this case, this can also be the right tooth flank of the first tooth gap observed in a top view of the marking, for example.

According to a further embodiment of the method, the determination of the distance upon provision of the toothed workpiece is performed using the following method steps: acquiring the position of the machine-readable, workpiece-specific marking within a machine coordinate system of the CNC-controlled multiaxis machine; acquiring the position of the reference geometry within the machine coordinate system of the CNC-controlled multiaxis machine; and computing the difference between the position of the reference geometry and the position of the marking.

The distance can be, for example, a radial distance and/or angle distance measured in relation to a central center axis of the spindle and the workpiece.

A further embodiment of the method is characterized by the ascertainment of the actual position of the workpiece in relation to the multiaxis machine on the basis of the marking, having the following method steps: reading the marking using a read unit of the CNC-controlled multiaxis machine and loading the workpiece-specific data set from the database into the controller of the CNC-controlled multiaxis machine; measuring the position of the marking within the machine coordinate system of the CNC-controlled multiaxis machine with the aid of a measuring unit of the CNC-controlled multiaxis machine; computing the position of the reference geometry within the machine coordinate system of the CNC-controlled multiaxis machine from the measured position of the marking and the distance between the marking and the reference geometry stored in the data set.

As soon as the marking is acquired, the position of the reference geometry can accordingly be concluded and the workpiece can be transferred into its setpoint position. Because the geometrical referencing can be stored individually in a database for each workpiece, the transfer of a workpiece from its actual position into the setpoint position can be performed specifically for the workpiece. It is therefore not necessary for the marking to have to be produced, for example, at a permanently specified radial distance and a permanently specified angle distance in relation to the reference geometry for each workpiece, since the individual distance of the marking to a reference geometry can be stored in the database for each workpiece. Thus, for example, a first workpiece can have a marking which has an angle distance of 30° to a first tooth gap of the gear teeth of the workpiece, while a second workpiece has a marking which is arranged offset at an angle distance of 60° to the first tooth gap of this second workpiece.

It can be provided that after the transfer of the workpiece from the actual position into the setpoint position, scanning and/or feeding of a measuring feeler or a machining tool occurs, wherein in particular scanning of the tooth flank delimiting the first tooth gap and/or feeding of a measuring feeler or a machining tool into the first tooth gap occurs.

If a toothed workpiece is to be hard-finished in the scope of known manufacturing methods after hardening, it can be provided that for the so-called feeding, centering, or spacing of a tool, for example, the tooth flanks of three tooth gaps are firstly scanned using a measuring feeler to acquire the influence of hardening distortions. Subsequently, the measured indexing can be averaged over the three acquired gaps. The requirement exists in this case when finding a first gap by way of the measuring feeler that the tooth head can also be encountered by the sensitive measuring feeler. The workpiece and the measuring feeler are thus brought together slowly and the measuring feeler is retracted upon a touch in the region of the head cone. The workpiece is subsequently pivoted by a half index and infed again. Running into the tooth head can result in deformations of the measuring feeler in spite of extreme programming caution.

According to at least some embodiments, centering or feeding of a tool into a tooth gap can now be performed entirely without prior contact, since the position of the first tooth gap is known sufficiently accurately by way of the geometrical referencing. This is possible in particular in the case of small hardening distortions to be expected. The actual hard finishing can thus begin substantially more rapidly.

If larger hardening distortions are to be expected, it can be provided that before the insertion of the tool into a tooth gap, the gap is scanned by a measuring feeler, but this scanning by the measuring feeler takes place substantially more rapidly, since the position of the first tooth gap is known sufficiently accurately by way of the geometrical referencing, and the measuring feeler can be infed at a high feed rate into the gap without the risk of a collision in the tooth head region. The advantage of a shortened processing time in comparison to known methods also exists here, wherein damage to the measuring feeler can be reliably avoided. In addition to a tooth gap or a tooth flank, alternatively or additionally a tooth base or a tooth head can be used for the geometrical referencing of the workpiece in conjunction with the marking.

Accordingly, the positioning of the workpiece on the basis of the marking can merely be a first, comparatively rough alignment of the workpiece, having an accuracy in the range of +/−0.2 mm. Scanning and feeding, for example, of a measuring feeler, can subsequently be performed in a known manner.

It can be provided that the automated acquisition of the marking and/or the ascertainment of an actual position of the workpiece in relation to the multiaxis machine are performed at least partially in a camera-based manner on the basis of the marking. A digital camera can accordingly be used as a read unit to read, for example, a barcode or QR code and moreover also as a measuring unit to acquire the position of the workpiece. In particular, in combination with a subsequent scanning and/or feeding, a rapid first alignment of the workpiece can be performed with the aid of the camera.

According to a further embodiment of the method, it can be provided that workpiece-specific real-time process data and/or workpiece-specific geometry data from a CNC-controlled multiaxis machine are stored in a database and used for the correction of the process kinematics of a CNC-controlled multiaxis machine employed in a subsequent measuring and/or machining step. Thus, with the aid of items of information stored in the database, on the one hand, an automated approach to a special tooth gap and, on the other hand, an automated individual adaptation of the process parameters for this tooth gap can be performed. If, for example, an indexing error of the gear teeth resulting from the preliminary gear cutting and hardening is to be corrected, the finishing of the toothed workpiece can be adapted and carried out fully automatically in a manner individual to the workpiece with the aid of the data stored in the database.

In order to enable a manual identification, for example, of a first tooth gap of a toothed workpiece, the marking could optionally have a shape which is arrow-like at least in sections pointing in the direction of a tooth gap or a tooth of the workpiece. For example, it can be defined that the marking is applied in the form of a QR code after the preliminary gear cutting such that a corner of a QR code points in the direction of the first tooth gap of the gear teeth.

This advantage can alternatively or additionally be achieved in that the marking, viewed in the radial direction, is arranged at least partially aligned with a tooth gap or a tooth of the workpiece.

According to a second aspect, at least some embodiments relate to a manufacturing system, configured to carry out the method disclosed herein, having a CNC-controlled multiaxis machine, which has a spindle for accommodating a toothed workpiece, which has a machine-readable, workpiece-specific marking, such as a QR code, a barcode, an RFID tag, or the like, which has a device for automatically acquiring the marking of the workpiece, which has a device for ascertaining an actual position of the workpiece in relation to the multiaxis machine on the basis of the marking, which has a device for transferring the workpiece from the actual position into a setpoint position in relation to the multiaxis machine, before a machining and/or measuring method is carried out in the multiaxis machine.

The manufacturing system according to at least some embodiments is accordingly configured to perform at least one automated positioning of the prepared workpiece with the aid of the workpiece-specific marking. In addition, an automated identification of the prepared workpiece can also be performed. The CNC-controlled multiaxis machine can be, for example, a gear cutting measuring machine or a finishing machine.

According to a further embodiment, the manufacturing system has a further CNC-controlled multiaxis machine, which is configured to provide the toothed workpiece, and a database for storing workpiece-specific data sets, wherein the CNC-controlled multiaxis machines are connected to the database and are configured to load workpiece-specific data from the database and to store workpiece-specific data in the database.

The further CNC-controlled multiaxis machine can be a machine which is connected upstream of a gear cutting measuring machine or a finishing machine in the manufacturing chain and which is configured for producing and storing the geometrical referencing.

The CNC-controlled multiaxis machine for providing the toothed workpiece can be a machine for preliminary gear cutting such as a gear cutting milling machine or the like. This machine can have as an integral component a unit for providing the machine-readable, workpiece-specific marking on the workpiece, such as a marking laser or a needle embossing unit. The determination of the distance between the marking and, for example, a specific tooth or a specific tooth gap of the gear teeth can also be performed in a camera-based manner here, to achieve a rapid geometrical referencing.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting, and are described in more detail below with reference to the drawings.

DETAILED DESCRIPTION

Figure 1:
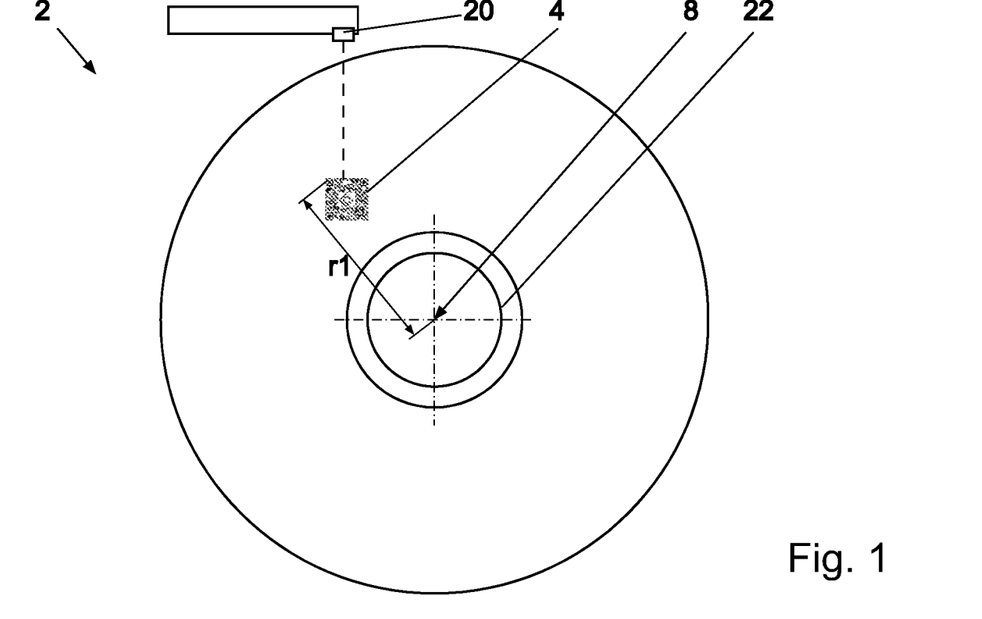
FIG. 1 schematically shows a non-toothed workpiece having a marking.
Figure 2:
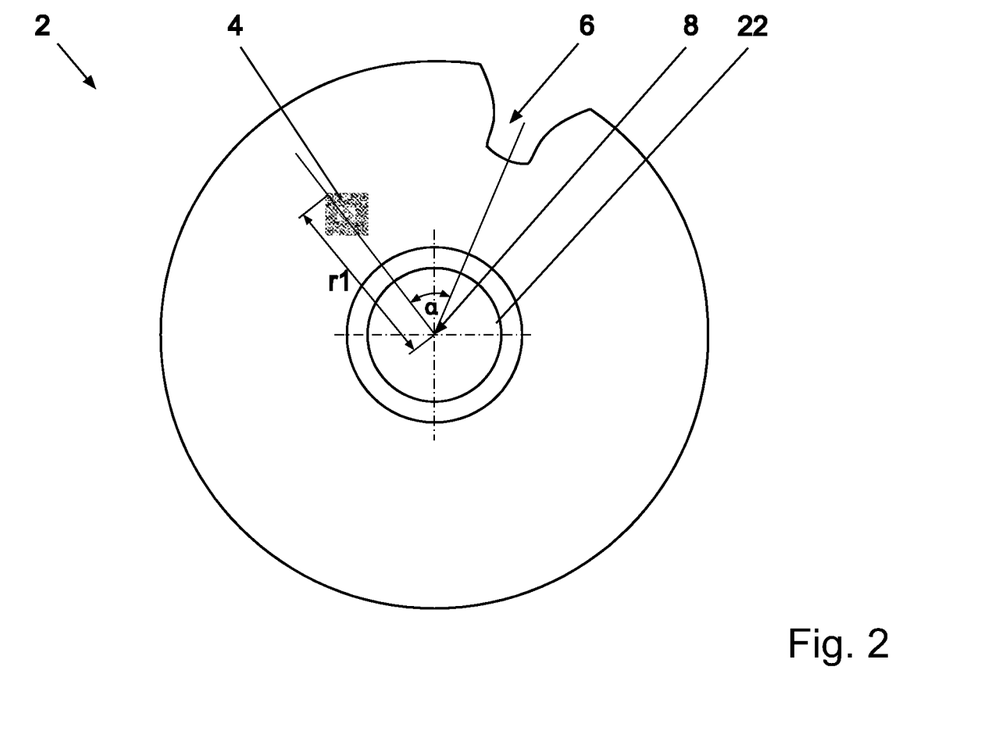
FIG. 2 schematically shows the workpiece of FIG. 1 having a first tooth gap.

FIG. 1 and FIG. 2 show the provision of a workpiece 2 by way of example.

The workpiece 2 is initially provided according to FIG. 1 as a non-toothed workpiece 2 without marking, i.e., as a blank. The provision of the machine-readable, workpiece-specific marking 4 is performed here before the manufacturing of a reference geometry. The workpiece 2 is accommodated on a spindle 22 of a CNC-controlled multiaxis machine, which is a gear cutting milling machine. The marking 4 can also have been applied previously, however, while the workpiece 2 was located, for example, on a lathe.

A marking unit 20 manufactures the QR code 4. The marking unit 20 is a marking laser 20 in the present case. According to alternative embodiments disclosed herein, the marking unit can be a needle embossing device.

Figure 3:
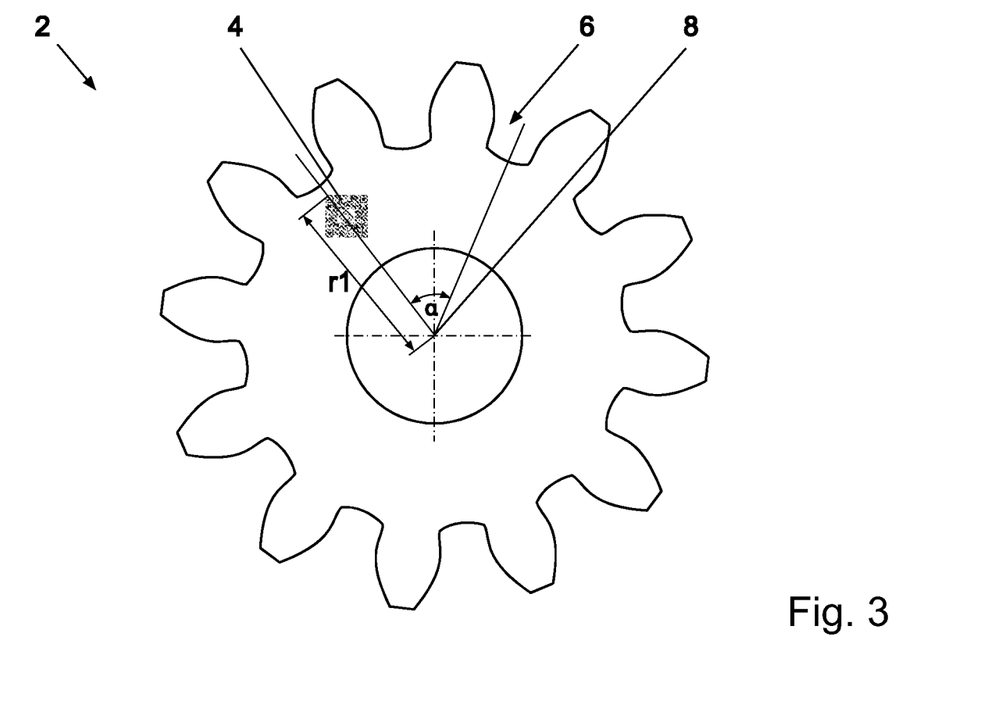
FIG. 3 schematically shows the workpiece of FIGS. 1 and 2 as toothed.
Figure 4:
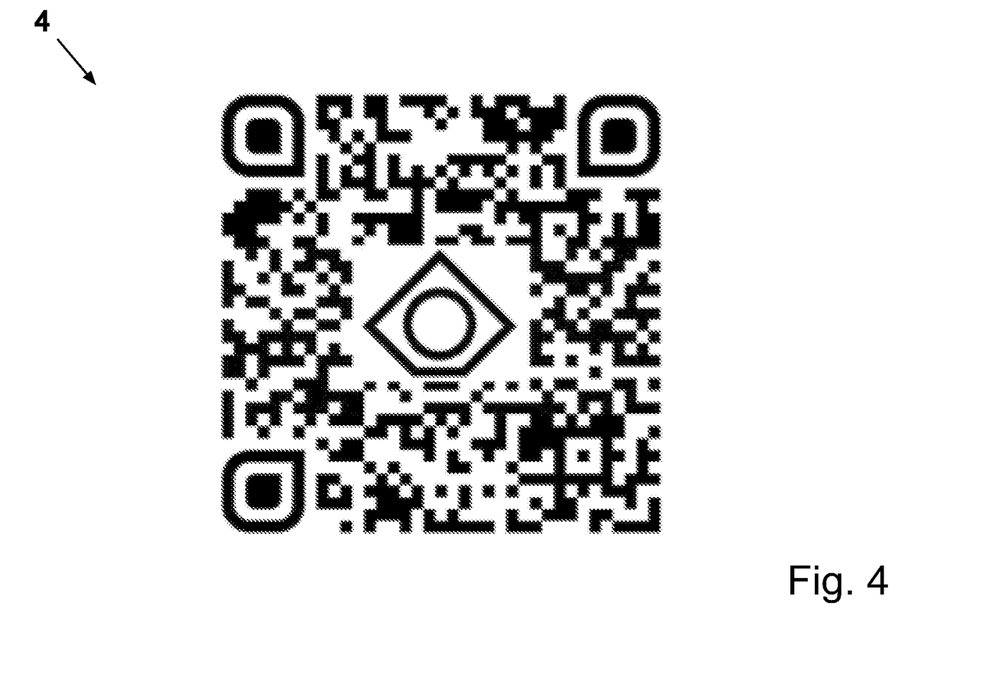
FIG. 4 schematically shows an enlarged view of the marking on the workpiece of FIGS. 1-3.

After the marking, the first tooth gap 6 (FIG. 2) and all further tooth gaps are manufactured, until the workpiece 2 is completely gear-cut (FIG. 3). For better comprehensibility, only the first tooth gap 6 is shown in FIG. 2, as is initially producible individually in a discontinuous gear cutting method, for example, by profile milling using a side milling cutter. According to alternative exemplary embodiments, the production of the first and all further tooth gaps can be performed with the aid of continuous gear cutting methods, for example, by hobbing.

FIG. 3 shows the toothed workpiece 2, which has the workpiece-specific, machine-readable marking 4, which is applied here in the region of an end face. The marking 4 is arranged offset by the angle $\alpha$ in relation to the first tooth gap 6 of the workpiece 2. Furthermore, the marking 4 has a radial distance r1 in relation to a center axis 8 of the workpiece 2.

The distances r1 and $\alpha$ can already have been stored in a database before the gear cutting, so that the CNC-controlled multiaxis machine manufactures the first tooth gap 6 on the basis of the position of the marking 4. Alternatively or additionally, the distances r1 and $\alpha$ can have been digitally acquired with the aid of a measuring unit such as a camera and stored in the database.

The QR code 4 provides a unique identifier for identifying the workpiece 2, so that the distances r1 and $\alpha$ stored in the database can be retrieved in subsequent manufacturing steps or measuring steps by the respective CNC-controlled manufacturing units or measuring units to automatically identify and position the workpiece 2.

Figure 5:
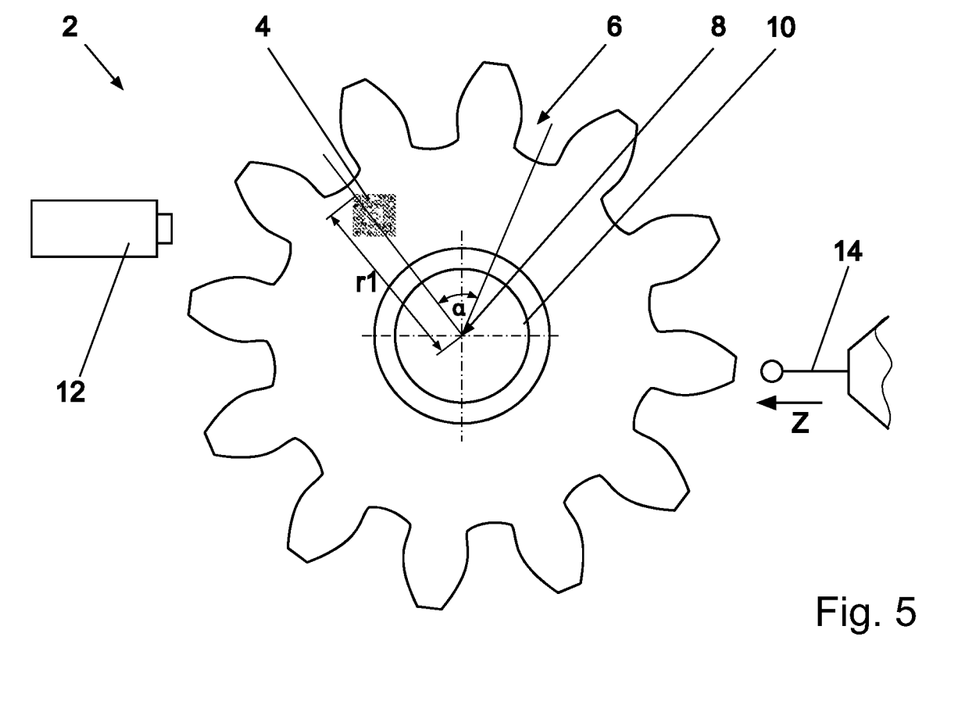
FIG. 5 schematically shows the workpiece of FIG. 3 in an actual position inside a gear cutting machine.

In the present case, the provided workpiece 2, whose geometrical referencing has been stored in the database, is attached after the preliminary gear cutting and hardening on a spindle 10 of a gear cutting measuring machine, in order to measure the workpiece 2 (FIG. 5). After the workpiece 2 has been accommodated on the spindle 10, a camera 12 acquires the marking 4, so that the workpiece 2 is identified and the items of information of the geometrical referencing are loaded from the database into the controller of the gear cutting measuring machine.

With the aid of the camera 12, furthermore the actual position of the workpiece 2 is determined in relation to a measuring feeler 14, wherein the measuring feeler 14 is to be fed into the tooth gap 6, for example, by a linear movement along a direction Z.

Figure 6:
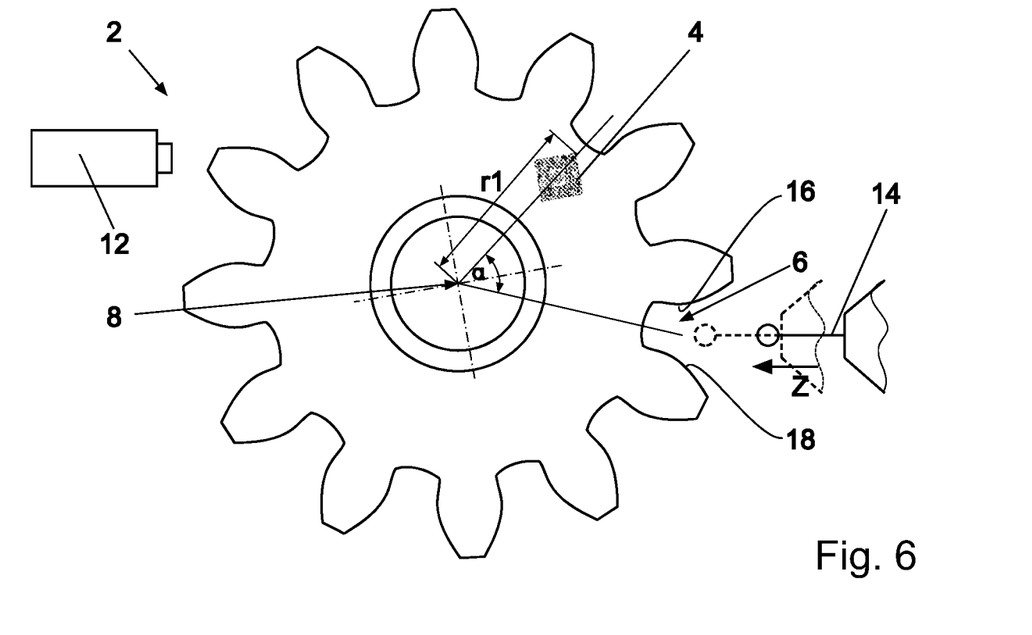
FIG. 6 schematically shows the workpiece of FIG. 3 in a setpoint position inside the gear cutting machine of FIG. 5.

The controller of the gear cutting measuring machine computes, on the basis of the data of the geometrical referencing from the database, the setpoint position of the workpiece 2, so that the workpiece 2 is positioned in the present described case by a rotation about the center axis 8 of the workpiece 2 in relation to the measuring feeler 14 (FIG. 6). As can be inferred from FIG. 6, the measuring feeler 14 can now be spaced in the tooth gap 6 by a linear movement along the direction Z. The spacing of the measuring feeler 14 is indicated in FIG. 6 by the additional dashed illustration of the measuring feeler 14 in a spaced position.

Scanning of the tooth flanks 16, 18 delimiting the tooth gap 6 is subsequently performed by the measuring feeler 14.

Depending on the design and arrangement of the machine-readable marking 4, instead of a digitally operating camera 12, the read unit and/or the measuring unit may be a sensor (for example, an optical sensor, a capacitive sensor, or inductive sensor) which can also be used to read the marking 4.

The machine-readable marking 4 can comprise, for example, a region or elements which are only visible in a specific wavelength range. By irradiating the marking 4 using a suitable wavelength, this region or these elements can be made visible to a sensor.

In at least some of the embodiments, the identification of the workpiece 2 and the acquisition of the machine-readable marking 4 for the purpose of positioning inside a multiaxis machine can thus be carried out separately.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method for the automated positioning of a toothed workpiece comprising:
   manufacturing a reference geometry on a workpiece by gear cutting to provide the toothed workpiece;
   affixing a machine-readable, workpiece-specific marking on the workpiece;
   determining a distance between the machine-readable, workpiece-specific marking and the reference geometry with a machine coordinate system of a first CNC-controlled multiaxis machine and storing the distance in a workpiece-specific data set of a database, the distance being acquired with a vector with respect to the machine coordinate system of the first CNC-controlled multiaxis machine;
   attaching the toothed workpiece having a machine-readable, workpiece-specific marking onto a spindle of one of the first CNC-controlled multiaxis machine or a second CNC-controlled multiaxis machine;
   automatically acquiring the machine-readable, workpiece-specific marking of the toothed workpiece;
   determining an actual position of the toothed workpiece relative to the one of the first or second CNC-controlled multiaxis machine to which the toothed workpiece is attached, the actual position of the toothed workpiece being determined by a position of the reference geometry, a position of the machine-readable, workpiece-specific marking and the distance between the machine-readable, workpiece-specific marking and the reference geometry stored in the workpiece-specific data set of the databases;
   transferring the toothed workpiece from the actual position into a setpoint position relative to the one of the first or second CNC-controlled multiaxis machine to which the toothed workpiece is attached, before performing one or more of machining or measuring the toothed workpiece in the one of the first or second CNC-controlled multiaxis machine to which the toothed workpiece is attached.

2. The method according to claim 1, including performing the step of affixing the machine-readable, workpiece-specific marking on the workpiece before the step of manufacturing the reference geometry.

3. The method according to claim 1, wherein the reference geometry includes a first tooth gap formed on the toothed workpiece or the reference geometry includes a tooth flank delimiting the first tooth gap formed on the toothed workpiece.

4. The method according to claim 1, wherein the step of determining the actual position of the toothed workpiece relative to the one of the first or second CNC-controlled multiaxis machine to which the toothed workpiece is attached further comprises:
   reading the machine-readable, workpiece-specific marking with a camera of the one of the first or second CNC-controlled multiaxis machine to which the toothed workpiece is attached; and
   loading the workpiece-specific data set from the database into a controller of the one of the first or second CNC-controlled multiaxis machine to which the toothed workpiece is attached; and
   determining the position of the reference geometry within the machine coordinate system of the one of the first or second CNC-controlled multiaxis machine to which the toothed workpiece is attached with the position of the marking and the distance stored in the data set between the machine-readable, workpiece-specific marking and the reference geometry.

5. The method according to claim 1, further including, after the step of transferring the toothed workpiece from the actual position into the setpoint position, one or more of (a) scanning a tooth flank delimiting a first tooth gap of the toothed workpiece or (b) feeding a measuring feeler or a machining tool into the first tooth gap of the toothed workpiece.

6. The method according to claim 1, including performing one or more of the steps of automatically acquiring of the machine-readable, workpiece-specific marking or determining the actual position of the toothed workpiece relative to the one of the first or second CNC-controlled multiaxis machine to which the toothed workpiece is attached at least partially with a digital camera.

7. The method according to claim 1, wherein
   the toothed workpiece is attached to the second CNC-controlled multiaxis machine, which is a gear cutting measuring machine or a finishing machine; and
   the method further includes making the toothed workpiece with the first CNC-controlled multiaxis machine, which is configured for preliminary gear cutting.

8. The method according to claim 1, further comprising:
   storing of one or more of workpiece-specific real-time process data or workpiece-specific geometry data in the database; and
   correcting process kinematics with the at least one or more of workpiece-specific real-time process data or workpiece-specific geometry data during one or more of a subsequent measuring step or a subsequent machining step of the toothed workpiece.

9. The method according to claim 1, wherein one or more of (a) at least part of the machine-readable, workpiece-specific marking defines an arrow shape pointing in a direction of a tooth gap or a tooth of the toothed workpiece, or (b) the machine-readable, workpiece-specific marking is at least partially aligned with the tooth gap or the tooth of the toothed workpiece when viewed in a radial direction to the toothed workpiece.

10. The method according to claim 2, wherein the reference geometry includes a first tooth gap formed on the toothed workpiece or the reference geometry includes a tooth flank delimiting the first tooth gap formed on the toothed workpiece.

11. The method according to claim 1, wherein
   the machine readable, workpiece-specific marking comprises a QR code, a barcode, or an RFID tag.

12. The method according to claim 2, wherein the step of determining the actual position of the toothed workpiece relative to the one of the first or second CNC-controlled multiaxis machine to which the toothed workpiece is attached further comprises:
   reading the machine-readable, workpiece-specific marking with a camera of the one of the first or second CNC-controlled multiaxis machine to which the toothed workpiece is attached; and
   loading the workpiece-specific data set from the database into a controller of the one of the first or second CNC-controlled multiaxis machine to which the toothed workpiece is attached; and determining the position of the reference geometry within the machine coordinate system of the one of the first or second CNC-controlled multiaxis machine to which the toothed workpiece is attached with the position of the marking and the distance stored in the data set between the machine-readable, workpiece-specific marking and the reference geometry.

\* \* \* \* \*